United States Patent [19]
Toot, Jr. et al.

[11] Patent Number: 5,995,498
[45] Date of Patent: Nov. 30, 1999

[54] CHANNEL STRENGTH MEASUREMENT SHIFTING SCHEME

[75] Inventors: Carl Bray Toot, Jr., Raleigh; Keith William Anderson, Durham, both of N.C.

[73] Assignee: Ericsson, Inc., Research Triangle Park, N.C.

[21] Appl. No.: 08/774,422

[22] Filed: Dec. 30, 1996

[51] Int. Cl.⁶ .................................................. H04Q 7/20
[52] U.S. Cl. .......................................... 370/332; 455/437
[58] Field of Search .................................... 370/331, 332; 445/436–444, 513, 525

[56] References Cited

U.S. PATENT DOCUMENTS

| | | | |
|---|---|---|---|
| 4,718,081 | 1/1988 | Brenig | 455/438 |
| 5,353,288 | 10/1994 | Abdesselem et al. | |
| 5,379,446 | 1/1995 | Murase | 455/444 |
| 5,493,563 | 2/1996 | Rozanski et al. | 370/332 |
| 5,594,949 | 1/1997 | Andersson et al. | |
| 5,729,539 | 3/1998 | Heeschen et al. | 370/332 |

FOREIGN PATENT DOCUMENTS

| | | |
|---|---|---|
| 458 768 | 11/1991 | European Pat. Off. . |
| 685 974 | 12/1995 | European Pat. Off. . |

*Primary Examiner*—Min Jung
*Attorney, Agent, or Firm*—Burns, Doane, Swecker & Mathis, L.L.P.

[57] ABSTRACT

In a radiocommunication system including at least one base station and a mobile station connected across a first radio channel to the base station, the signal strengths of the first radio channel and neighboring radio channels are measured in the mobile station to determine whether reselection to a neighboring radio channel is necessary. Each radio channel is measured at various points in a frame period or in different frame periods, the measurements occurring in different time slots. The points at which the signal strength measurements of each radio channel are made may be rotated among the different frame periods, the measurements may be made at random points in the different frame periods, or the starting times of the measurements may be rotated among or occur randomly in the different frame periods. Alternately, the signal strengths of each radio channel may be measured at different points in a single frame period. The measurements of the signal strength of the each radio channel are averaged, and the averaged measurements are compared to determine whether reselection from the first radio channel to a neighboring radio channel is necessary.

36 Claims, 5 Drawing Sheets

CHANNEL 300

FIG. 3b

CHANNEL 312

FIG. 3c

CHANNEL 333

CHANNEL STRENGTH MEASUREMENT SHIFTING SCHEME

BACKGROUND

The present invention relates to radiocommunication systems and, more particularly, to techniques for measuring signal strengths of radio channels.

Figure 1:
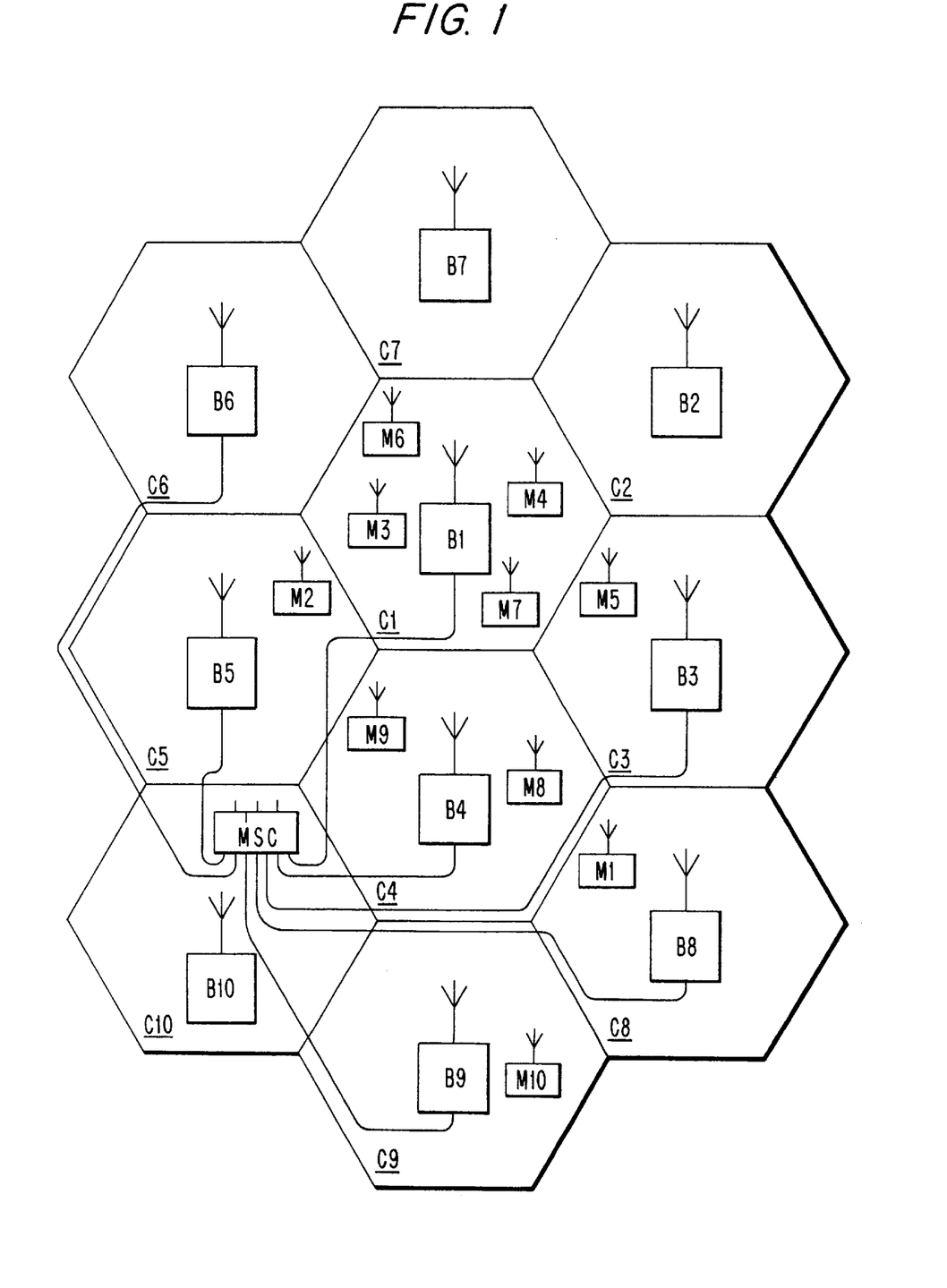
FIG. 1 illustrates a typical mobile radio communication system.

FIG. 1 depicts a conventional mobile radiocommunication system. Referring to FIG. 1, the mobile radio communication system includes a land system and many mobile stations M1–M10. The land system consists of at least one mobile switching center MSC and several radio base stations B1–B10 distributed over cells C1–C10. Each radio base station serves a cell by sending and receiving information to and from the mobile stations M1–M10 over radio channels. Control channels are used to communicate control and overhead information between the base stations and mobile stations. Traffic channels are each used to support a temporary, dedicated connection (e.g., to handle a voice call) between a base station and a mobile station. The mobile switching center MSC, connected on one side to the public switching telephone network (not shown) and on the other to the base stations B1–B10, performs most of the control functions required for calls to and from the mobile stations M1–M10.

Because the cells C1–C10 are relatively small, the mobile stations M1–M10 often travel between a number of different cells. When a mobile station travels from one cell to another cell, the mobile station switches from a radio channel from a home base station in the cell in which the mobile station originates to a radio channel from a target base station in the cell to which the mobile station travels. The process of switching an established call from a radio channel provided by a base station in one cell to a radio channel provided by a base station in another cell is known as intercell channel reselection.

It is desirable that a mobile station with an established connection on a radio channel to a base station be able to maintain the connection when moving within the same cell, even if the radio channel being used is subject to increased interference. Sometimes interference can be alleviated by changing to a new radio channel within the cell. This process is usually referred to as an intracell channel reselection.

In general, radiocommunication is only possible when the desired information carrying radio signals have sufficiently strong signal strength in relation to noise and interfering radio signals at the receiver in the mobile station. The minimum signal strength of course depends on the particular features of the system, e.g., the kind of modulation and the receiver used. In order to determine if an established connection should continue on a radio channel between a mobile station and a base station or whether intercell or intracell channel reselection needs to be performed, various measurements are made on radio signals received at the mobile station.

Referring again to FIG. 1, the mobile station determines whether intercell or intracell channel reselection is necessary based on signal strengths of the radio channels as measured by the mobile station. In response to a neighbor list order from the land system, the mobile station measures the signal strengths and, possibly, other parameters (e.g., bit error rate) of the radio channel across which it is connected to a home base station and neighboring radio channels emitted by the home base station and/or by the base stations in neighboring cells. Based on the signal strength measurements, the mobile station determines whether reselection to a neighboring radio channel in the same cell or in a different cell is necessary.

Since the radio channel signal strengths measured by the mobile station often contain noise, it is inappropriate to use a single, latest measurement value as the only basis for deciding whether reselection is necessary. Thus, techniques such as averaging are applied to the measured signal strengths, and the mobile station uses the average received signal strength of the radio channels to determine whether reselection is necessary.

Various different types of radio channels are used in radiocommunication systems and need to be measured. For example, for systems employing analog radio channels, the traffic channels and the control channels are typically provided on separate frequencies. Thus, it is a relatively simple matter to measure the signal strength of any particular channel, whether a control channel or a traffic channel, simply by tuning to the designated frequency and taking one or more measurements.

Some systems employ digital radio channels. For example, in a TDMA cellular radiotelephone system, each radio channel is divided into a series of time slots, each of which contains a burst of information from a data source, e.g., a digitally encoded portion of a voice conversation and data. The time slots are grouped into successive TDMA frames having a predetermined duration. A radio channel thus comprises one or more time slots in each successive TDMA frame. Thus, several radio channels may occupy a single frequency using the TDMA methodology.

In some cases, TDMA traffic channels and control channels have not been intermingled on the same frequencies. For example, the systems specified by interim standard IS-54-B indicated that the control channels should be placed on 21 predetermined control channel frequencies, which 21 frequencies are distinct from those used to support TDMA traffic channels. This scheme allowed, among other things, for the control channels to be readily located by mobile stations accessing a radiocommunication system.

More recently, however, systems have been specified wherein the control channels and the traffic channels can be mixed together on the same frequency. For example, those systems specified by the interim standard IS-136 promulgated by EIA/TIA provide techniques for locating digital control channels that are mixed in with digital traffic channels, i.e., allowing for digital control channels and digital traffic channels to be placed on the same frequency. This creates certain difficulties with respect to the measurement of the channel strength of particular channels.

Consider, for example, a frame containing Digital Control Channel (DCCH) data in some time slots and Digital Voice Channel or Digital Traffic Channel (DTC) data in other time slots. The DCCH slots contain fixed patterns of data, e.g., mostly 1's or mostly 0's. In contrast, the DTC slots contain variable patterns of 1's and 0's, resembling almost pseudo-random patterns. When modulation occurs across the DTC slots, the 1's and 0's are averaged out, producing a flat modulation. However, modulation across the DCCH slots results in a modulation which is not flat, but rather a modulation of mostly 1's or mostly 0's. For this reason, signal strength measurement made in a DCCH slot may be higher than a measurement made in a DTC slot.

Figure 2:
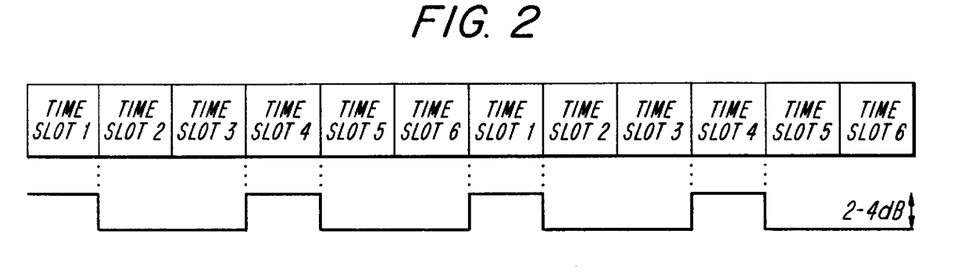
FIG. 2 illustrates a repeating time slot layout and measured signal strengths over two TDMA frames.

FIG. 2 illustrates this concept. Therein, a repeating time slot layout and measured signal strengths over two TDMA frames are depicted. In the slot layout shown in FIG. 2, each frame is divided into six slots. DCCH data occupies time slots 1 and 4, and DTC data occupies time slots 2 and 5 and time slots 3 and 6. As shown in FIG. 2, the signal strength is measured from 2–4 dB higher in the DCCH slots than in the DTC slots. This disparity in measured signal strengths between different time slots on the same frequency means that the conventional technique of simply tuning to a particular frequency on which a particular channel is being transmitted and taking a measurement in an arbitrary time slot may provide an inaccurate result. That is, in order to guarantee an accurate signal strength measurement in a system wherein control channels and traffic channels can be placed on the same frequency, it becomes necessary to identify and measure signal strength in an appropriate timeslot.

Figure 3A:
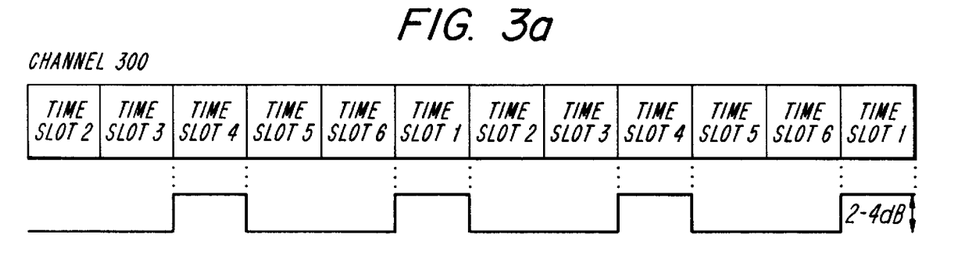
FIGS. 3a–3c illustrate time slot layouts and measured signal strengths over two TDMA frames for typical digital radio channels.
Figure 3B:
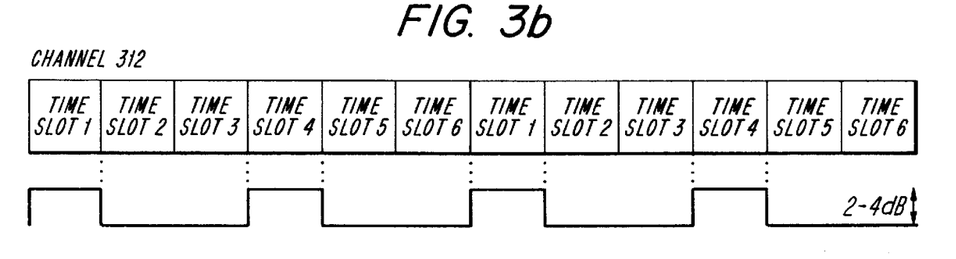
Figure 3C:
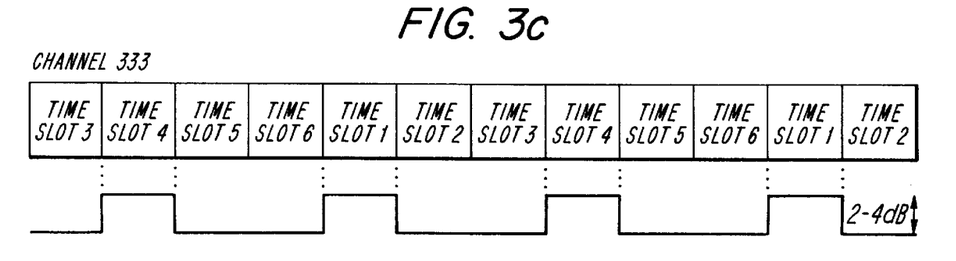

This solution, however, is problematic due to the fact that the transmissions on different frequencies may be unsynchronized. Unsynchronized transmissions are illustrated in FIGS. 3a–3c which depict time slots and measured signal strengths over two TDMA frames for different frequencies represented by different channel numbers. Referring to FIG. 3a, the time slots associated with radio channel number 300 on a first frequency are transmitting time slot 2 at time $t_0$, which may, for example, be a DTC slot. Referring to FIG. 3b, radio channel number 312 on a second frequency is carrying time slot 1 at time $t_0$, which may, for example, be a DCCH slot. Referring to FIG. 3c, radio channel number 333 on a third frequency is carrying time slot 3 at time $t_0$, which may, for example, be a DTC slot. As can be seen from FIGS. 3a–3c, signal strength values of radio channel numbers 300 and 333 measured at the beginning of a frame period may be 2–4 dB lower than a signal strength value of radio channel number 312 measured at the same moment. Depending on the timing for neighboring radio channels and the point during the frame period at which the channels are measured, the signal strength for a particular radio channel may vary considerably, for example, as much as 4 dB. Thus, to even attempt to precisely measure the signal strength of a particular TDMA channel, i.e., by measuring in one or more of the specific time slots which comprise that channel, would require re-synchronizing to the TDMA frame structure being transmitted on each new frequency to be measured.

Despite these complexities, it is still important to accurately measure the signal strengths of neighboring radio channels because inaccurate measurements may adversely affect reselection. Some systems have been designed to reselect radio channels in response to a relatively small change in signal strength measurement of, for example, 4 dB. If signal strength measurements can vary as much as 4 dB depending on the time slot of a frame that a signal strength measurement is performed in, the mobile station may be connected to new radio channels more often than necessary or oscillate between two radio channels of equal signal strength. Every time radio channels are changed, the mobile station has to keep its receiver on longer which causes the mobile station to draw more power. Also, because the mobile station is occupied with reselection, there is a chance that data will be missed.

Moreover, due to the lack of synchronization between base station transmissions in some systems, and to avoid additional complexity, it is desirable to measure signal strength without considering in which time slot a measurement is taken. Thus, there is a need for a technique for measuring signal strengths of neighbor list radio channels accurately, without taking into account which time slots of a frame the signal strength measurements are made in.

SUMMARY

According to the present invention, in a radio communication system comprising at least one base station and a mobile station connected across a first radio channel to the base station, a method and system are provided for measuring in the mobile station signal strengths of the first radio channel and neighboring radio channels to determine whether reselection to a neighboring radio channel is necessary. Each radio channel is measured at various points in a frame period or in different frame periods, the measurements occurring in different time slots. The measured signal strengths of each radio channel are averaged, and the averaged measurements are compared to determine whether reselection from the first radio channel to a neighboring radio channel is necessary.

According to a first embodiment, the points at which signal strength measurements are made are rotated among different frame periods. Measuring the signal strength of a radio channel at rotated points in different frame periods assures that the signal strengths are measured in different time slots. Averaging the signal strength measurements of the different time slots for each radio channel provides accurate estimations of the signal strengths of the radio channels.

According to a second embodiment, the signal strength measurements are made at random points in different frame periods. Measuring the signal strength of each radio channel at random points in different frame periods assures that over time the signal strength are measured in different time slots. Averaging the signal strength measurements of the different time slots for each radio channel provides accurate estimations of the signal strengths of the radio channels.

According to a third embodiment, the starting times of the signal strength measurements are rotated among or occur randomly in different frame periods. By changing the starting times of the measurements of signal strength of a radio channel in different frame periods, the signal strength can be expected to be measured in different time slots. Averaging the signal strength measurements of the different time slots provides accurate estimations of the signal strengths of the radio channels.

According to a fourth embodiment, signal strengths are measured at regular intervals in a frame period. Measuring the signal strengths of a radio channel at regular intervals in a frame period assures that the signal strength of the radio channel are measured in different time slots. Averaging the signal strength measurements of the different time slots for each radio channel provides accurate estimations of the signal strengths of the radio channels.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

According to the present invention, signal strengths of neighboring digital radio channels are measured accurately by varying the points in time at which the signal strength of a particular frequency is measured within a single frame period or across multiple frame periods and averaging the signal strength measurements. Measurements are made for each digital radio channel at different times during, for example, a 20 millisecond digital frame. If the order in which the radio channels are measured is shifted with respect to the repeating frame structure, measurements will not always be performed in the same time slot in different frames. In this way, frequencies which carry a mixture of DCCH time slots and DTC time slots will not always be measured in, for example, DCCH time slots. This, in turn, is expected to provide a more accurate, average signal strength reading associated with any particular channel.

For ease of illustration, the following embodiments will be described in terms of the time slot layout structure shown in FIG. 2. That is, the following embodiments will be described in terms of a TDMA frame divided into six slots, time slots 1 and 4 corresponding to DCCH slots, time slots 2 and 5 corresponding to a first DTC's slots, and time slots 3 and 6 corresponding to a second DTC's slots.

Figure 4:
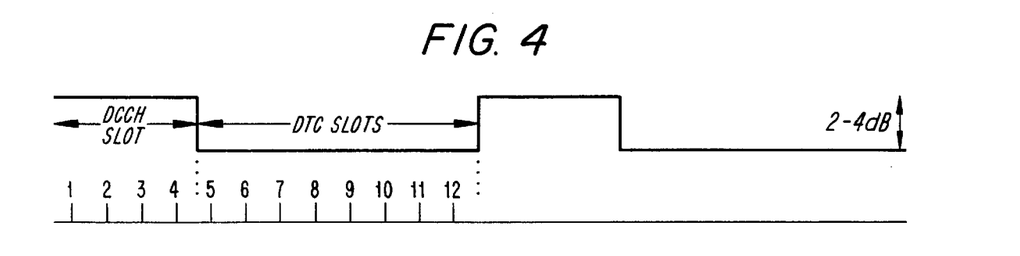
FIG. 4 illustrates conventional timing of neighbor list signal strength measurements.

Suppose that a mobile station's receiver is capable of taking 12 different measurements over the time span of one frame. In such an exemplary situation, illustrated in FIG. 4, the particular time slot within which a measurement is taken will depend on the order in which measurements are performed. For example, if the frequency represented in FIG. 4 is measured during any one of intervals 1–4, then the measurement may be relatively high since the measurement is taken in the DCCH slot. Alternatively, if the measurement is taken during any one of intervals 5–12, then the measurement would be expected to be somewhat lower, since the measurement is taken in a DTC slot.

Figure 5A:
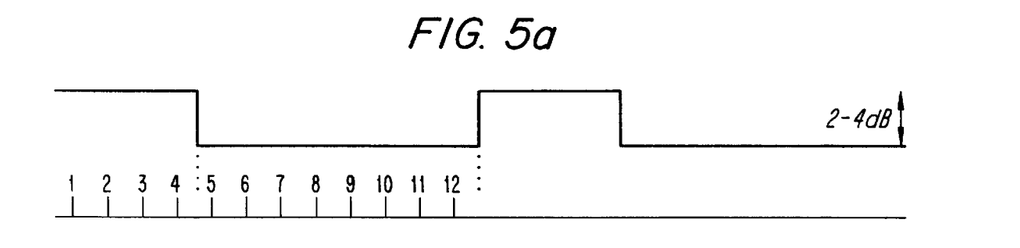
FIGS. 5a–5c illustrate exemplary rotation of neighbor list signal strength measurements in different frame periods according to a first embodiment of the present invention.
Figure 5B:
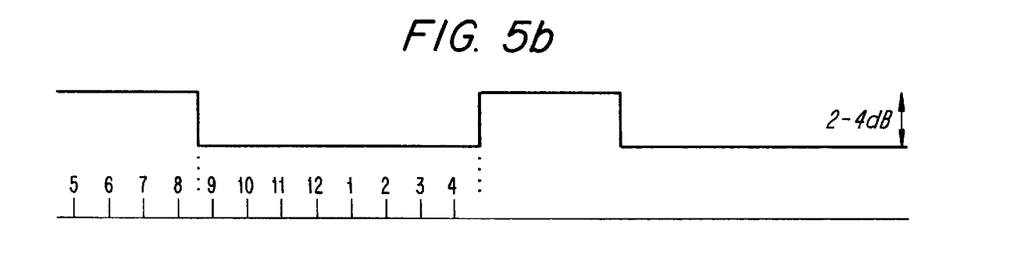
Figure 5C:
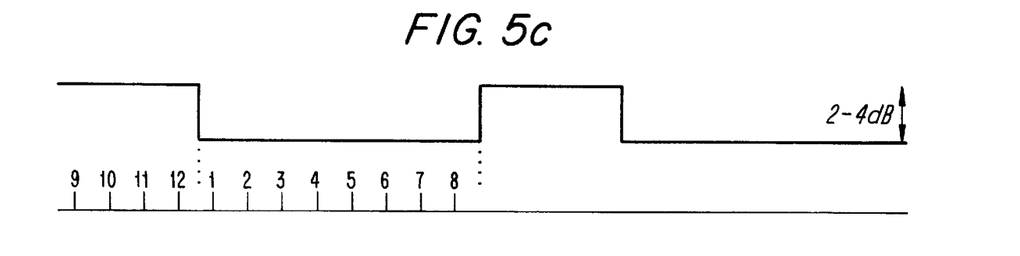

According to a first embodiment, one technique for accurately measuring the signal strengths of neighbor list radio channels includes rotating the points in time at which the signal strength measurements are made in different frames. This is illustrated in FIGS. 5a–5c which depict exemplary rotation of neighbor list signal strength measurements during different frame periods. Referring to FIG. 5a, the first radio channel in the neighbor list may be measured during measurement interval 1 at the beginning of a first frame period. Thus, the first measurement is made during a DCCH slot.

Referring to FIG. 5b, a second measurement of the first radio channel may be made at a point in time which is, for example, 13.4 milliseconds from the beginning of a second frame period. Thus, the second measurement is made in a time slot two removed from the first measurement, which time slot is a DTC slot in this example. As shown in FIG. 5b, this results in a signal strength measurement which is, for example, 2–4 dB lower than that measured in FIG. 5a.

Referring to FIG. 5c, a third measurement of the first radio channel may be made at a point in time which is, for example, 6.7 milliseconds from the beginning of a third frame period. This corresponds to the time slot between the time slots measured in FIGS. 5a and 5b, which is a DTC slot in this example. As shown in FIG. 5c, this results in a measured signal strength which is, for example, 2–4 dB lower than that measured in FIG. 5a.

By rotating the relative times during the frame periods the signal strength measurements of the radio channels are made, the disparity in measured signal strengths in different time slots can be averaged without explicitly taking into account precisely where in the frame the DCCH slots and DTC slots are located for a particular radio channel. Averaging the results of these measurements for each radio channel results in values that more accurately represent the signal strengths of the radio channels which are identified in the neighbor list.

According to a second embodiment, another technique for accurately measuring the signal strengths of neighbor list radio channels is to randomize the order in which the signal strengths of the radio channels are measured in different frame periods. By continuously changing the order in which the radio channels are measured, consecutive measurements of radio channels will, over time, occur in different time slots.

Figure 6A:
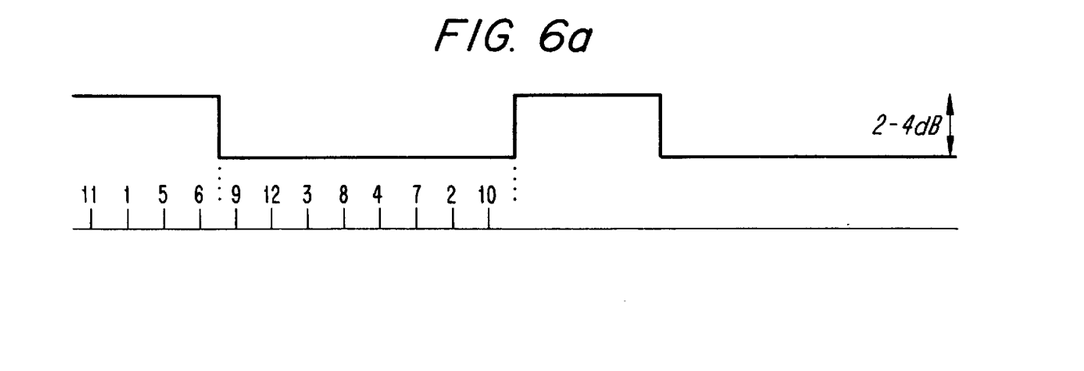
FIGS. 6a–6c illustrate randomizing the order of neighbor list signal strength measurements in different frame periods according to a second embodiment of the present invention.
Figure 6B:
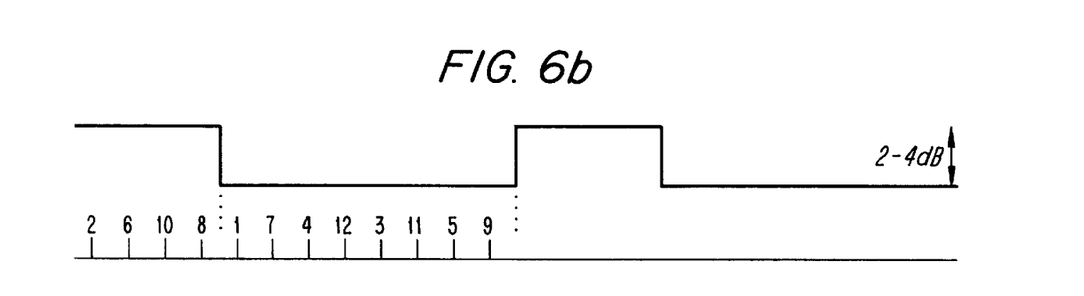
Figure 6C:
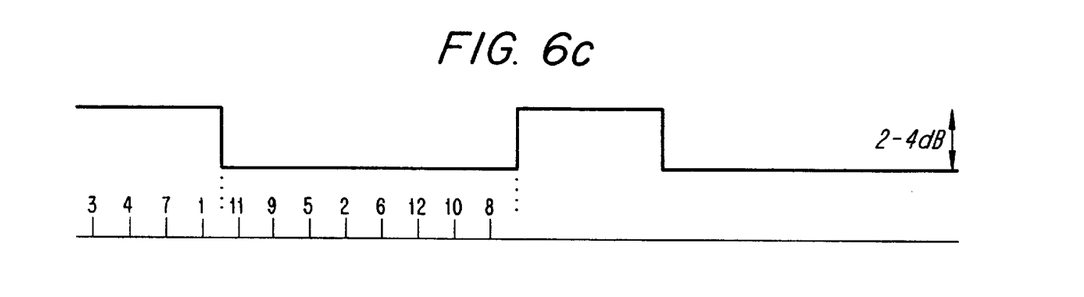

FIGS. 6a–6c illustrate randomizing the order of neighbor list signal strength measurements according to the second embodiment of the present invention. Referring to FIG. 6a, a first measurement of a first radio channel in the neighbor list may be made at a point in time which is, for example, 1.7 milliseconds from the beginning of a first frame period, which happens to be within a DCCH slot.

Referring to FIG. 6b, a second measurement of the first radio channel may be made at a point in time which is, for example, 6.7 milliseconds from the beginning of a second frame period. Thus, the second measurement is made in a time slot one removed from the first measurement, which time slot is a DTC slot in this example. As shown in FIG. 6b, this measurement results in a measured signal strength which is, for example, 2–4 dB lower than that measured in FIG. 6a.

Referring to FIG. 6c, a third measurement of the first radio channel may be made at a point in time which is, for example, 5 milliseconds from the beginning of the frame period. This corresponds the same time slot as in the first measurement, which time slot is a DCCH slot in this example. As shown in FIG. 6c, this third measurement results in a signal strength which is the same as that measured in FIG. 6a.

By measuring the signal strengths of the radio channels at random points during different frame periods, the disparity in measured signal strengths in different time slots can be averaged without explicitly taking into account precisely where in the frame the DCCH slots and DTC slots are located for a particular radio channel. Averaging the results of these measurements for each radio channel results in values that more accurately represent the signal strengths of the radio channels which are identified in the neighbor list.

According to a third embodiment, yet another technique for accurately measuring the signal strengths of neighbor list channels is to measure the signal strengths of the radio channels in the same order specified in the neighbor list but to change the starting time of the measurements in different frame periods. If the starting times of the neighbor list signal strength measurements in the different frame periods are random with respect to where the time slots are located in the frame period, then consecutive measurements for a particular radio channel can, over time, be expected to occur in different time slots in different frame periods. Similarly, if the starting times of the neighbor list signal strength measurements are rotated in different frame periods, then consecutive measurements for a particular radio channel can be expected to occur in different time slots in different frame periods.

Figure 7A:
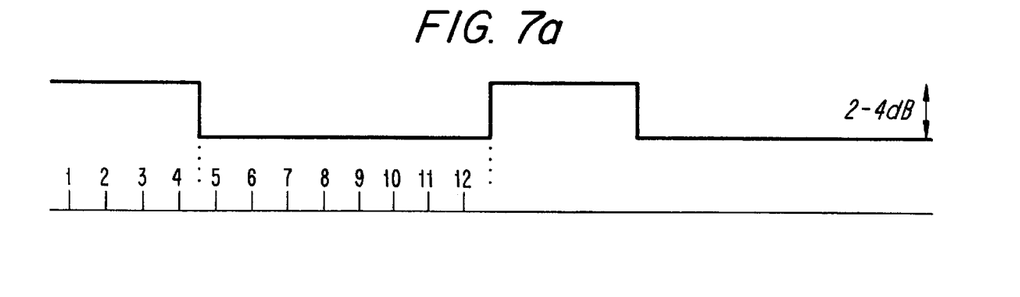
FIGS. 7a–7c illustrate randomizing or rotating the starting time of neighbor list signal strength measurements in different frame periods according to a third embodiment of the present invention.
Figure 7B:
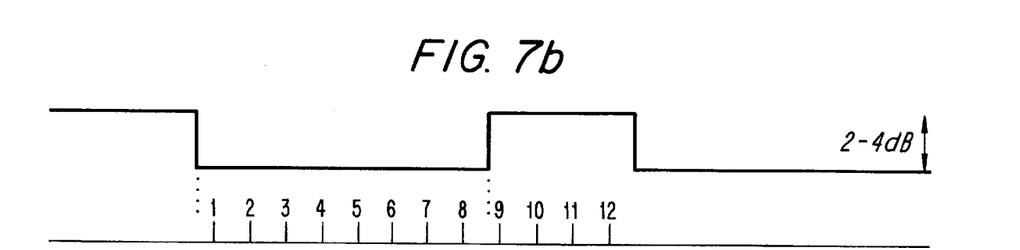
Figure 7C:
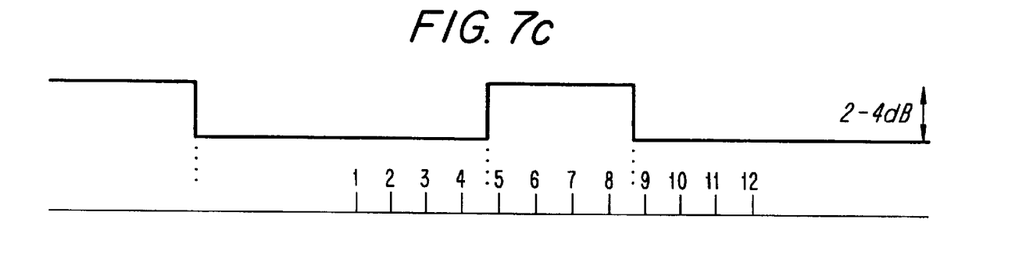

FIGS. 7a–7c depict randomizing or rotating the starting times of measurements of the neighbor list radio channels. Referring to FIG. 7a, first measurements may be started at the beginning of a first frame period. Thus, a first radio channel in the neighbor list is measured during measurement interval 1 at the beginning of a first frame period, which happens to be a DCCH slot in this example.

Referring to FIG. 7b, second measurements may be started at a point 6.7 milliseconds from the beginning of the frame period, which is a DTC slot in this example. Thus, the first radio channel is measured during a DTC slot. As shown in FIG. 7b, this results in a measured signal strength which is, for example, 2–4 dB lower than that measured in FIG. 7a.

Referring to FIG. 7c, third measurements may be started at a point 13.4 milliseconds from the beginning of a third frame period, which is a DTC slot in this example. Thus, the first radio channel is measured a third time during a DTC slot. As shown in FIG. 7c, this results in a measured signal strength which is, for example, 2–4 dB lower than that measured in FIG. 7a.

By changing the starting times of neighbor list signal strength measurements in the different frame periods, the disparity in measured signal strengths in different time slots can be averaged without explicitly taking into account precisely where in the frame the DCCH slots and DTC slots are located for a particular radio channel. Averaging the results of these measurements for each radio channel results in values that more accurately represent the signal strengths of the radio channels which are identified in the neighbor list.

Figure 8:
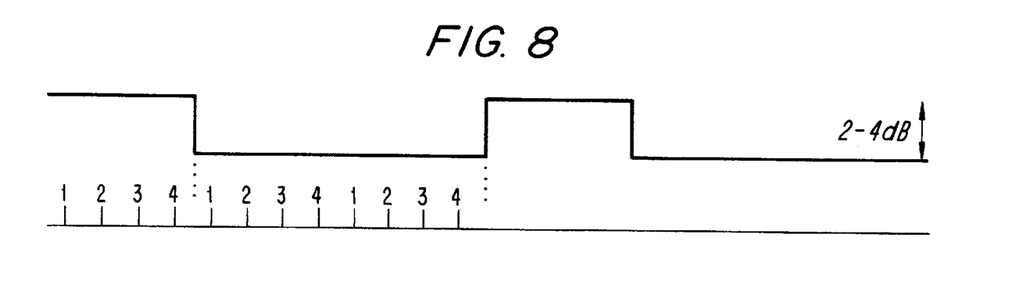
FIG. 8 illustrates spreading multiple neighbor list signal strength measurements throughout a frame period according to a fourth embodiment of the present invention.

According to a fourth embodiment, still another technique for accurately measuring the signal strengths of neighbor list radio channels is to measure each radio channel multiple times during a frame period. This is shown in FIG. 8 which depicts multiple signal strength measurements of individual radio channels spread throughout a frame period. As shown in FIG. 8, four radio channels are each measured three times during a single frame period.

Referring to FIG. 8, a first measurement of a first radio channel in the neighbor list may be made at the beginning of the frame period. This corresponds to a DCCH slot in this example. A second measurement of the first radio channel may be made at a point in time 6.7 milliseconds from the beginning of the frame period, which corresponds to a DTC slot in this example. This results in a measured signal strength which is, for example, 2–4 dB lower than that resulting from the first measurement. A third measurement of the first radio channel may be made at a point in time 13.4 milliseconds from the beginning of the frame period, which corresponds to a DTC slot in this example. This results in a measured signal strength which is, for example, 2–4 dB lower than that resulting from the first measurement.

By repeating the signal strength measurements of the radio channels at regular intervals in a frame period, the disparity in measured signal strengths in different time slots can be averaged without explicitly taking into account precisely where in the frame the DCCH slots and DTC slots are located for a particular radio channel. Averaging the results of these measurements for each radio channel results in values that more accurately represent the signal strengths of the radio channels which are identified in the neighbor list.

According to the present invention, by varying the points at which the signal strengths of a particular radio channel are measured in a frame period or in different frame periods and averaging the signal strength measurements, the signal strengths of neighboring radio channels can be measured more accurately, without explicitly taking into account which time slots the measurements are made in for a particular radio channel. Averaged signal strengths of neighboring radio channels are compared to determine if reselection is necessary. Accurate measurement of the signal strengths of the radio channels ensures that reselection will only be performed when necessary.

The embodiments above have been described in terms of a neighbor list measurement system for determining channel reselection, in which a mobile station determines when channel reselection is necessary based on measured channel signal strengths. However, one skilled in the art would appreciate that the invention may be also be useful for other applications, such as Mobile Assisted Channel Allocation (MACA), in which the mobile station reports channel signal strength measurements to a base station, and the base station determines when channel reselection is necessary. Details of MACA are provided in commonly assigned U.S. patent application Ser. No. 08/356,634, filed on Dec. 15, 1994 and entitled "Mobile Assisted Channel Allocation", which is herein incorporated by reference. The present invention is directed to the problems of measuring channel signal strengths which are apparent both in the neighbor list measurement system and the MACA system. Therefore, one skilled in the art would appreciate that the present invention is applicable to both types of systems.

While particular embodiments have been described and illustrated, it should be understood that the invention is not limited thereto. For example, while the embodiments above have been described in terms of a specific slot layout structure for digital radio channels, one skilled in the art would appreciate that alternate slot layouts may be used. This application contemplates any and all modifications that fall within the spirit and scope of the invention as defined by the following claims.

What is claimed is:

1. In a radiocommunication system including at least one base station and a mobile station connected across a first radio channel to the at least one base station, a method of measuring signal strengths of the first radio channel and neighboring radio channels in the mobile station to determine whether reselection to a neighboring radio channel is necessary, the method comprising the steps of:

measuring a signal strength of the first radio channel at different points in different frame periods and averaging the measurements of the signal strength of the first radio channel;

measuring a signal strength of at least one of the neighboring radio channels at different points in different frame periods and averaging the measurements of the signal strength of the at least one neighboring radio channel; and comparing the averaged measurements to determine whether reselection from the first radio channel to the at least one neighboring radio channel is necessary.

2. The method of claim 1, wherein the points at which measurements are made for each radio channel are rotated among the different frame periods.

3. The method of claim 1, wherein the measurements for each radio channel are made at random points in the different frame periods.

4. The method of claim 1, wherein starting times of the measurements are rotated among the different frame periods.

5. The method of claim 1, wherein starting times of the measurements in different frame periods are random.

6. The method of claim 1, wherein the measurements for each radio channel are made in different time slots in different frame periods.

7. In a radiocommunication system including at least one base station and a mobile station connected across a first radio channel to the at least one base station, a method of measuring signal strengths of the first radio channel and neighboring radio channels in the mobile station to determine whether reselection to a neighboring radio channel is necessary, the method comprising the steps of:

measuring a signal strength of the first radio channel at regular intervals in a frame period and averaging the measurements of the signal strength of the first radio channel;

measuring a signal strength of at least one of the neighboring radio channels at regular intervals in the frame period and averaging the measurements of the signal strength of the at least one neighboring radio channel; and comparing the averaged measurements to determine whether reselection from the first radio channel to the at least one neighboring radio channel is necessary.

8. The method of claim 7, wherein the measurements for each channel are made in different time slots in the same frame period.

9. A radiocommunication system comprising:

at least one base station; and a mobile station connected to said at least one base station across a first radio channel, wherein said mobile station measures a signal strength of the first radio channel at different points in different frame periods, averages the measurements of the signal strength of the first radio channel, measures a signal strength of at least one neighboring radio channel at different points in different frame periods, and averages the measurements of the signal strength of the at least one radio neighboring channel, and wherein the mobile station determines whether reselection from the first radio channel to the at least one neighboring radio channel is necessary by comparing the averaged measurements of the signal strength of the first radio channel and the at least one neighboring radio channel.

10. The system of claim 9, wherein the points at which measurements for each radio channel are made are rotated among the different frame periods.

11. The system of claim 9, wherein the measurements for each radio channel are made at random points in the different frame periods.

12. The system of claim 9, wherein starting times of the measurements are rotated among the different frame periods.

13. The system of claim 9, wherein starting times of the measurements in different frame periods are random.

14. The system of claim 9, wherein the measurements for each radio channel are made in different time slots in different frame periods.

15. A radiocommunication system comprising:

at least one base station; and a mobile station connected to said at least one base station across a first radio channel, wherein said mobile station measures a signal strength of the first radio channel at different points in a frame period, averages the measurements of the signal strength of the first radio channel, measures a signal strength of at least one neighboring radio channel at different points in the frame period, and averages the measurements of the signal strength of the at least one neighboring radio channel, and wherein the mobile station determines whether reselection from the first radio channel to the at least one neighboring radio channel is necessary by comparing the averaged measurements of the signal strength of the first radio channel and the at least one neighboring radio channel.

16. The system of claim 15, wherein the measurements for each radio channel are made in different time slots in the frame period.

17. A radiocommunication system comprising:

at least one base station; and a mobile station connected to said at least one base station across a first radio channel, wherein said mobile station measures a signal strength of the first radio channel at different points in different frame periods, averages the measurements of the signal strength of the first radio channel, measures a signal strength of at least one neighboring radio channel at different points in different frame periods, averages the measurements of the signal strength of the at least one radio neighboring channel, and reports the averaged measurements to said at least one base station, and wherein said at least one base station determines whether reselection from the first radio channel to the at least one neighboring radio channel is necessary by comparing the averaged measurements of the signal strength of the first radio channel and the at least one neighboring radio channel.

18. The system of claim 17, wherein the points at which measurements for each radio channel are made are rotated among the different frame periods.

19. The system of claim 17, wherein the measurements for each radio channel are made at random points in the different frame periods.

20. The system of claim 17, wherein starting times of the measurements are rotated among the different frame periods.

21. The system of claim 17, wherein starting times of the measurements in different frame periods are random.

22. The system of claim 17, wherein the measurements for each radio channel are made in different time slots in different frame periods.

23. A radiocommunication system comprising:

at least one base station; and a mobile station connected to said at least one base station across a first radio channel, wherein said mobile station measures a signal strength of the first radio channel at different points in a frame period, averages the measurements of the signal strength of the first radio channel, measures a signal strength of at least one neighboring radio channel at different points in the frame period, averages the measurements of the signal strength of the at least one neighboring radio channel, and reports the averaged measurements to said at least one base station, and wherein said at least one base station determines whether reselection from the first radio channel to the at least one neighboring radio channel is necessary by comparing the averaged measurements of the signal strength of the first radio channel and the at least one neighboring radio channel.

24. The system of claim 23, wherein the measurements for each radio channel are made in different time slots in the frame period.

25. The method of claim 1, wherein the signal strengths are measured in slots containing control data and in slots containing traffic data in the first radio channel and in at least one of the neighboring radio channels.

26. The method of claim 7, wherein the signal strengths are measured in slots containing control data and in slots containing traffic data in the first radio channel and in at least one of the neighboring radio channels.

27. The system of claim 9, wherein the signal strengths are measured in slots containing control data and in slots containing traffic data in the first radio channel and in at least one of the neighboring radio channels.

28. The system of claim 15, wherein the signal strengths are measured in slots containing control data and in slots containing traffic data in the first radio channel and in at least one of the neighboring radio channels.

29. The system of claim 17, wherein the signal strengths are measured in slots containing control data and in slots containing traffic data in the first radio channel and in at least one of the neighboring radio channels.

30. The system of claim 23, wherein the signal strengths are measured in slots containing control data and in slots containing traffic data in the first radio channel and in at least one of the neighboring radio channels.

31. The method of claim 1, wherein the neighboring channels include channels in the same cell as the first radio channel and channels in neighboring cells.

32. The method of claim 7, wherein the neighboring channels include channels in the same cell as the first radio channel and channels in neighboring cells.

33. The system of claim 9, wherein the neighboring channels include channels in the same cell as the first radio channel and channels in neighboring cells.

34. The system of claim 15, wherein the neighboring channels include channels in the same cell as the first radio channel and channels in neighboring cells.

35. The system of claim 17, wherein the neighboring channels include channels in the same cell as the first radio channel and channels in neighboring cells.

36. The system of claim 23, wherein the neighboring channels include channels in the same cell as the first radio channel and channels in neighboring cells.

* * * * *